United States Patent
Okuno et al.

(10) Patent No.: US 10,570,020 B2
(45) Date of Patent: *Feb. 25, 2020

(54) SILICA PARTICLE AND METHOD OF PREPARING SILICA PARTICLE

(71) Applicant: FUJI XEROX CO., LTD., Tokyo (JP)

(72) Inventors: Hiroyoshi Okuno, Kanagawa (JP); Satoshi Inoue, Kanagawa (JP); Yoshifumi Iida, Kanagawa (JP); Tomohito Nakajima, Kanagawa (JP); Yuka Zenitani, Kanagawa (JP); Yoshifumi Eri, Kanagawa (JP); Yasuo Kadokura, Kanagawa (JP); Yasuhisa Morooka, Kanagawa (JP); Shunsuke Nozaki, Kanagawa (JP); Takeshi Iwanaga, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 573 days.

This patent is subject to a terminal disclaimer.

(21) Appl. No.: 15/001,950

(22) Filed: Jan. 20, 2016

(65) Prior Publication Data

US 2017/0073236 A1 Mar. 16, 2017

(30) Foreign Application Priority Data

Sep. 14, 2015 (JP) .................................. 2015-180970

(51) Int. Cl.
*C01B 33/12* (2006.01)
(52) U.S. Cl.
CPC .................................... *C01B 33/12* (2013.01)
(58) Field of Classification Search
None
See application file for complete search history.

(56) References Cited

U.S. PATENT DOCUMENTS

| | | | | |
|---|---|---|---|---|
| 2,891,875 A * | 6/1959 | Phreaner | ............... | C01B 33/113 106/287.14 |
| 2,940,947 A * | 6/1960 | Welch | ..................... | C08J 3/226 106/490 |
| 6,057,073 A | 5/2000 | Hagiwara | | |
| 6,197,270 B1 | 3/2001 | Sonoda et al. | | |
| 6,316,155 B1 | 11/2001 | Kudo et al. | | |
| 10,081,718 B2 * | 9/2018 | Takeuchi | ................. | C08K 3/36 |
| 10,100,176 B2 * | 10/2018 | Takeuchi | ................. | C08K 9/06 |

| | | |
|---|---|---|
| 2001/0051270 A1 | 12/2001 | Yamashita et al. |
| 2003/0134950 A1 | 7/2003 | Kudo et al. |
| 2003/0232185 A1 | 12/2003 | Shimamura et al. |
| 2007/0201917 A1 | 8/2007 | Teshigawara |
| 2008/0069606 A1 | 3/2008 | Yamashita et al. |
| 2009/0067894 A1 | 3/2009 | Yamada et al. |
| 2010/0009277 A1 | 1/2010 | Ogawa et al. |
| 2010/0203441 A1 | 8/2010 | Kataoka et al. |
| 2011/0177444 A1 | 7/2011 | Mattison, Jr. et al. |
| 2012/0189851 A1 | 7/2012 | Zenitani et al. |
| 2014/0050504 A1 | 2/2014 | Fukao et al. |
| 2014/0057107 A1 | 2/2014 | Zenitani et al. |
| 2016/0139521 A1 | 5/2016 | Tsuda et al. |

FOREIGN PATENT DOCUMENTS

| | | |
|---|---|---|
| EP | 1 845 419 A2 | 10/2007 |
| EP | 2 479 208 A1 | 7/2012 |
| JP | H05-295301 A | 11/1993 |
| JP | H10-236817 A | 9/1998 |
| JP | 2000-044226 A | 2/2000 |
| JP | 2000-330328 A | 11/2000 |
| JP | 2002-167212 A | 6/2002 |
| JP | 2009-098700 A | 5/2009 |
| JP | 4347201 B2 | 10/2009 |
| JP | 2009-292915 A | 12/2009 |
| JP | 2010-185999 A | 8/2010 |
| JP | 4758655 B2 | 8/2011 |
| JP | 4828032 B2 | 11/2011 |
| JP | 2013-166667 A | 8/2013 |
| JP | 2014-162678 A | 9/2014 |
| JP | 2014-185069 A | 10/2014 |
| WO | 2009/139502 A1 | 11/2009 |

OTHER PUBLICATIONS

Jul. 26, 2017 Office Action Issued in U.S. Appl. No. 15/211,974.
Apr. 10, 2017 Office Action issued in U.S. Appl. No. 15/211,974.
Apr. 14, 2017 Office Action issued in U.S. Appl. No. 15/218,781.
U.S. Appl. No. 15/211,974, filed Jul. 15, 2016 in the name of Kadokura et al.
U.S. Appl. No. 15/218,781, filed Jul. 25, 2016 in the name of Morooka et al.
Apr. 9, 2019 Office Action issued in Japanese Patent Application No. 2015-180970.
Jul. 4, 2018 Office Action issued in Chinese Application No. 201610807129.2.
Feb. 12, 2018 Office Action issued in U.S. Appl. No. 15/207,990.
Jun. 28, 2017 Office Action issued in U.S. Appl. No. 15/218,450.
Aug. 29, 2017 Office Action issued in Japanese Application No. 2016-024141.

* cited by examiner

*Primary Examiner* — Clinton A Brooks
(74) *Attorney, Agent, or Firm* — Oliff PLC

(57) ABSTRACT

A silica particle has a compression and aggregation degree of from 60% to 95% and a particle compression ratio of from 0.20 to 0.40.

11 Claims, No Drawings

SILICA PARTICLE AND METHOD OF PREPARING SILICA PARTICLE

CROSS-REFERENCE TO RELATED APPLICATIONS

This application is based on and claims priority under 35 USC 119 from Japanese Patent Application No. 2015-180970 filed Sep. 14, 2015.

BACKGROUND

1. Technical Field

The present invention relates to a silica particle, and a method of preparing a silica particle.

2. Related Art

A silica particle is used as an additive component or a main component of cosmetics, rubber, or a polishing agent, and, for example, plays a role of improving toughness of a resin, improving fluidity of powder, or preventing a phenomenon (packing) which is similar to the closest packing. The characteristics of the silica particle are considered to easily depend on a shape of the silica particle and a surface property, and deformation of the silica particle or surface treatment of the silica particle is suggested.

SUMMARY

According to an aspect of the invention, there is provided a silica particle, which has a compression and aggregation degree of from 60% to 95% and a particle compression ratio of from 0.20 to 0.40.

DETAILED DESCRIPTION

An exemplary embodiment which is an example of the present invention will be described in detail.

Silica Particle

A silica particle according to the exemplary embodiment has a compression and aggregation degree of from 60% to 95%, and a particle compression ratio of from 0.20 to 0.40.

The silica particle according to the exemplary embodiment is a silica particle which has excellent fluidity and dispersibility, and improved handling properties, as the compression and aggregation degree and the particle compression ratio satisfy the above ranges, respectively.

The reason thereof is unknown, but the following reasons may be considered.

Because of excellent fluidity, the silica particle is used as a fluidizing agent for an inorganic or organic powder material. However, the silica particle has a low bulk density and has a characteristic of easily being blown in the air, while fluidity is excellent. For this reason, there is a case where the silica particles are not only unlikely to fill the inside of a container, but also unlikely to be replaced between containers. In addition, when using the silica particle, there is also a case where weighing and transporting (conveying) are difficult. In other words, in many cases, it is difficult to handle the silica particle.

Meanwhile, a technology for treating a surface of the silica particle by using a hydrophobic treatment agent with the aim of enhancing fluidity of the silica particle and dispersibility to an adhesion target, is known. In this technology, fluidity of the silica particle and dispersibility to the adhesion target are improved, but a low bulk density and a characteristic of easily being blown in the air are not improved, and handling properties of the silica particle remain low.

In addition, a technology for treating the surface of the silica particle by using both the hydrophobic treatment agent and silicone oil with the aim of giving high hydrophobicity to the surface of the silica particle, or improving adhesiveness to the adhesion target, is also known. In this technology, adhesiveness to the adhesion target is improved, the characteristic of easily being blown in the air is improved, and the handling properties of the silica particle are improved. However, on the contrary, fluidity and dispersibility are likely to deteriorate.

In other words, it may be said that fluidity and dispersibility of the silica particle, and the handling properties have an opposite relationship.

In contrast to this, in the silica particle according to the exemplary embodiment, as described above, three characteristics including fluidity, dispersibility, and handling properties become excellent by setting the above range of the compression and aggregation degree and the particle compression ratio.

Here, the meaning of setting the above range of the compression and aggregation degree and the particle compression ratio will be described in order.

First, the meaning of setting the compression and aggregation degree of the silica particle to be from 60% to 95% will be described.

The compression and aggregation degree in the exemplary embodiment is an index illustrating the handling properties of the silica particle. The index is expressed by a degree of being loosened of a compact when dropping the compact of the silica particle, after obtaining the compact of the silica particle by compressing the silica particle.

Therefore, an aggregation force (intermolecular force) tends to be strengthened as the compression and aggregation degree increases, and the bulk density is likely to increase and the silica particle is unlikely to be blown in the air when the silica particle is allowed to stand. In addition, a calculation method of the compression and aggregation degree will be described later in detail.

In the exemplary embodiment, the compression and aggregation degree of the silica particle is controlled to be high, that is, from 60% to 95%. For this reason, the silica particle according to the exemplary embodiment has excellent handling properties. However, an upper limit value of the compression and aggregation degree is 95% from the viewpoint of ensuring fluidity and dispersibility while maintaining excellent handling properties.

Next, the meaning of setting the particle compression ratio of the silica particle to be from 0.20 to 0.40 will be described.

The particle compression ratio in the exemplary embodiment is an index illustrating fluidity of the silica particle. Specifically, the particle compression ratio is expressed by a ratio of a difference between a hardened apparent specific gravity and a loosened apparent specific gravity of the silica particle, and the hardened apparent specific gravity ((hardened apparent specific gravity-loosened apparent specific gravity)/hardened specific gravity).

Therefore, fluidity of the silica particle increases as the particle compression ratio decreases. In addition, when fluidity is high, dispersibility to the adhesion target also tends to increase. In addition, a calculation method of the particle compression ratio will be described later in detail.

the exemplary embodiment, the particle compression ratio is controlled to be low, that is, from 0.20 to 0.40. For this reason, the silica particle according to the exemplary embodiment has excellent fluidity and dispersibility to the adhesion target. However, a lower limit value of the particle compression ratio is set to be 0.20 from the viewpoint of improving the handling properties while maintaining excellent fluidity and dispersibility to the adhesion target.

According to the description above, the silica particle according to the exemplary embodiment is likely to flow and disperse to the adhesion target, and further, uniquely, the bulk density of the silica particle is likely to increase, and the silica particle is unlikely to be blown in the air. Therefore, the silica particle according to the exemplary embodiment has excellent fluidity and dispersibility, and improved handling properties.

Furthermore, it is preferable that the silica particle according to the exemplary embodiment has a particle dispersion degree which is from 90% to 100%.

Here, the meaning of setting the particle dispersion degree of the silica particle to be from 90% to 100% will be described.

The silica particle in the exemplary embodiment is an index illustrating the dispersibility of the silica particle. The index is expressed by a degree of being likely to disperse to the adhesion target of the silica particle in a primary particle state. Specifically, when a calculated coverage to the surface of the adhesion target by the silica particle is $C_0$, and a measured coverage is C, the particle dispersion degree is expressed by a ratio of the measured coverage C to the adhesion target, and the calculated coverage $C_0$ (measured coverage C/calculated coverage $C_0$).

Therefore, as the particle dispersion degree increases, the silica particle is unlikely to aggregate, and is likely to disperse to the adhesion target in the primary particle state. In addition, a calculation method of the particle dispersion degree will be described later in detail.

The silica particle according to the exemplary embodiment has more excellent dispersibility to the adhesion target by controlling the particle dispersion degree to be high, that is, from 90% to 100%, while maintaining the compression and aggregation degree and the particle compression ratio to be in the above range.

In addition, an example of a method of obtaining the silica particle having the above-described excellent three characteristics including fluidity, dispersibility, and the handling properties, includes a method of making a siloxane compound adhere to the surface of the silica particle by using the siloxane compound having a relatively large weight average molecular weight. Specifically, a method of treating the surface of the silica particle with the siloxane compound having a viscosity of from 1,000 cSt to 50,000 cSt, so that a surface adhesion amount of the siloxane compound becomes from 0.01% by weight to 5% by weight with respect to the silica particle, may be employed.

Here, the surface adhesion amount in the exemplary embodiment is a ratio with respect to the silica particle (untreated silica particle) before treating the surface of the silica particle. Hereinafter, the silica particle after the surface treatment will be simply referred to as a "silica particle".

The silica particle according to the exemplary embodiment has high fluidity, dispersibility, and the handling properties, and the compression and aggregation degree and the particle compression ratio are likely to satisfy the above-described requirements as the surface of the silica particle is treated by using the siloxane compound having a viscosity of from 1,000 cSt to 50,000 cSt so that the surface adhesion amount of the siloxane compound becomes from 0.01% by weight to 5% by weight with respect to the silica particle.

The reason thereof is unknown, but the following reasons may be considered.

Since the viscosity is within the above range, the siloxane compound according to the exemplary embodiment has relatively high viscosity. When a small amount of siloxane compound having such a characteristic adheres to the surface of the silica particle within the above range, a function which originates from the characteristic of the siloxane compound of the surface of the silica particle appears. The mechanism thereof is not apparent. However, releasability which originates from the siloxane compound is likely to appear as a small amount of siloxane compound having relatively high viscosity adheres to the surface of the silica particle within the above range when the silica particle flows, or adhesiveness between the silica particles decreases as the intermolecular force decreases by steric hindrance of the siloxane compound. Accordingly, fluidity and dispersibility of the silica particle increase.

In addition, when the silica particle is allowed to stand or is pressurized, a long molecular chain of the siloxane compound of the surface becomes entangled, aggregation between the silica particles is strengthened, closest packing properties of the silica particle increase, and at the same time, the silica particle is prevented from being blown. In addition, the aggregation force of the silica particle by the entanglement of the long molecular chain of the siloxane compound may be considered released when the silica particle flows.

In the description above, when a small amount of siloxane compound in which viscosity is within the above range adheres to the surface of the silica particle within the above range, the compression and aggregation degree and the particle compression ratio are likely to satisfy the above-described requirements, and the particle dispersion degree is also likely to satisfy the above-described requirements. In addition, a case where the silica particle moves to other members and contaminates materials, or performance of the materials deteriorates, occurs less.

Hereinafter, characteristics of the silica particle according to the exemplary embodiment will be described in detail.

Compression and Aggregation Degree

The compression and aggregation degree of the silica particle is from 60% to 95%, preferably from 65% to 95%, and more preferably from 70% to 95%, from the viewpoint of ensuring fluidity and dispersibility while maintaining the handling properties.

The compression and aggregation degree is calculated by the following method.

A disk-shaped mold having a diameter of 6 cm is filled with 6.0 g of silica particles. Next, the mold is compressed for 60 seconds by 5.0 t/cm$^2$ of pressure by using a compression molding machine (manufactured by Maekawa Testing Machine MFG. Co., Ltd.), and a compact (hereinafter, referred to as a "compact before dropping") of the compressed disk-shaped silica particle is obtained. After this, the weight of the compact before dropping is measured.

Next, the compact before dropping is disposed on a sieving net which is 600 μm, and the compact before dropping is dropped under a condition that an amplitude is 1 mm by an oscillation sieving machine (manufactured by Tsutsui Scientific Instruments Co., Ltd.: product number VIBRATING MVB-1). Accordingly, the silica particle is dropped via the sieving net from the compact before dropping, and the compact of the silica particle remains on the sieving net. After this, the weight of the compact of the remaining silica particle (hereinafter, referred to as a "compact after dropping") is measured.

In addition, by using the following formula (1), the compression and aggregation degree is calculated from a ratio of the weight of the compact after dropping and the weight of the compact before dropping.

compression and aggregation degree=(weight of the compact after dropping/weight of the compact before dropping)×100    Formula (1)

Particle Compression Ratio

The particle compression ratio of the silica particle is from 0.20 to 0.40, preferably from 0.24 to 0.38, and more preferably from 0.28 to 0.36, from the viewpoint of ensuring the handling properties while maintaining excellent fluidity and dispersibility to the adhesion target.

The particle compression ratio is calculated by the following method.

The loosened apparent specific gravity and the hardened apparent specific gravity of the silica particle are measured by using a powder tester (manufactured by Hosokawa Micron Corporation). In addition, by using the following formula (2), particle compression ratio is calculated from the ratio of the difference between the hardened apparent specific gravity and the loosened apparent specific gravity of the silica particle, and the hardened apparent specific gravity.

particle compression ratio=(hardened apparent specific gravity-loosened apparent specific gravity)/hardened apparent specific gravity    Formula (2)

In addition, the "loosened apparent specific gravity" is a measured value which is derived by filling a container having a volume of 100 cm$^3$ with the silica particle and weighing the container, and is referred to as a filling specific gravity in a state where the silica particle is naturally dropped in the container. The "hardened apparent specific gravity" is referred to as an apparent specific gravity when an impact is imparted (tapping) to a bottom portion of the container repeatedly 180 times, the deairation is performed, the silica particles are rearranged, and the container is more tightly filled.

Particle Dispersion Degree

The particle dispersion degree of the silica particle is preferably 90% to 100%, more preferably 95% to 100%, and still more preferably 100%, from the viewpoint of more excellent dispersibility to the adhesion target.

The particle dispersion degree is a ratio of the measured coverage C to the adhesion target (polyester resin particle: volume average particle diameter=100 μm, weight average molecular weight Mw=50,000) and the calculated coverage $C_0$, and is calculated by using the following formula (3).

particle dispersion degree=measured coverage C/calculated coverage $C_0$    Formula (3)

Here, the calculated coverage $C_0$ to the surface of the polyester resin particle by the silica particle may be calculated by the following formula (3-1) when the volume average particle diameter of the polyester resin particle is dt(m), an average equivalent circle diameter of the silica particle is da(m), a specific gravity of the polyester resin particle is ρt, a specific gravity of the silica particle is ρa, the weight of the polyester resin particle is Wt(kg), and an amount added of the silica particle is Wa(kg).

calculated coverage $C_0=\sqrt{3}/(2\pi)\times(\rho t/\rho a)\times(dt/da)\times(Wa/Wt)\times100(\%)$    Formula (3-1)

The measured coverage C to the surface of the polyester resin particle by the silica particle may be calculated by the following formula (3-2) by measuring a signal strength of a silicon atom which originates from the silica particle with respect only to the polyester resin particle, only to the silica particle, and only to the polyester resin particle containing the silica particle, by an X-ray photoelectron spectroscopy (XPS) ("JPS-9000MX": manufactured by Japan Electron Optics Laboratory Co., Ltd.).

measured coverage $C=(z-x)/(y-x)\times100(\%)$    Formula (3-2)

(In the formula (3-2), x indicates the signal strength of the silicon atom which originates from the silica particle only of the polyester resin particle. y indicates the signal strength of the silicon atom which originates from the silica particle only of the silica particle. z indicates the signal strength of the silicon atom which originates from the silica particle with respect to the polyester resin particle containing the silica particle.)

Average Equivalent Circle Diameter

The average equivalent circle diameter of the silica particle is preferably from 40 nm to 200 nm, more preferably from 50 nm to 180 nm, and still more preferably from 60 nm to 160 nm, from the viewpoint of excellent fluidity, dispersibility, and the handling properties of the silica particle.

An average equivalent circle diameter D50 of the silica particle is obtained by imaging an image observing a primary particle after dispersing the silica particle to the resin particle (polyester, weight average molecular weight Mw=50,000) having a volume average particle diameter of 100 μm by a scanning electron microscope (SEM) device (manufactured by Hitach, Ltd.: S-4100), inputting the image to an image analyzing device (LUZEXIII, manufactured by Nireco Corporation), measuring an area for each particle by analyzing the image of the primary particle, and calculating an equivalent circle diameter from the area value. 50% of the diameter (D50) in an accumulated frequency of the obtained circle diameter is the average equivalent circle diameter D50 of the silica particle. In addition, the electron microscope adjusts magnification so that the electron microscope images approximately 10 to 50 silica particles in one visual field, and the equivalent circle diameter of the primary particle is obtained by combining the observation results of the plurality of visual fields.

Average Circularity

A shape of the silica particle may be any of a spherical shape or an irregular shape. However, the average circularity is preferably from 0.85 to 0.98, more preferably from 0.90 to 0.98, and still more preferably from 0.93 to 0.98, from the viewpoint of excellent fluidity, dispersibility, and the handling properties of the silica particle.

The average circularity of the silica particle is measured by the following method.

First, circularity of the silica particle is obtained as "100/SF2" calculated by the following formula from plane image analysis of the obtained primary particle by observing the primary particle after dispersing the silica particle to the resin particle (polyester, weight average molecular weight Mw=50,000) having a volume average particle diameter of 100 μm by the SEM device.

circularity$(100/SF2)=4\pi\times(A/I^2)$    Formula

[In the formula (1), I indicates the length of the circumference of the primary particle on the image, and A indicates a projected area of the primary particle.]

In addition, the average circularity of the silica particle is obtained as 50% of the circularity in the accumulated frequency of circularity of 100 primary particles obtained by the above-described plane image analysis.

Hereinafter, a configuration of the silica particle according to the exemplary embodiment will be described in detail.

Silica Particle

The silica particle is a particle having silica (that is, $SiO_2$) as a main component, and may be crystalline or noncrystalline. The silica particle may be a particle which is prepared by using the silicon compound, such as water glass or alkoxysilane, as a raw material, or may be a particle obtained by pulverizing quartz.

Specific examples of the silica particle include a silica particle (hereinafter, referred to as a "sol-gel silica particle") which is prepared by a sol-gel method, an aqueous colloidal silica particle, an alcoholic silica particle, a fumed silica particle obtained by a vapor phase method, and a fused silica particle. Among these, the sol-gel silica particle is preferable.

In the silica particle according to the exemplary embodiment, the compression and aggregation degree, the particle compression ratio, and the particle dispersion degree satisfy a specific range. In order to set the compression and aggregation degree, the particle compression ratio, and the particle dispersion degree to be within the specific ranges, respectively, the silica particle is preferably subjected to the surface treatment with the siloxane compound.

With respect to the surface treatment method, it is preferable to subject the surface of the silica particle to the surface treatment in supercritical carbon dioxide. In addition, the surface treatment method will be described later.

Siloxane Compound

The siloxane compound is not particularly limited, if the siloxane compound has a siloxane structure in a molecular structure.

Examples of the siloxane compound include silicone oil and silicone resin. Among these, silicone oil is preferable from the viewpoint of surface treatment to the surface of the silica particle in an approximately uniform state.

Examples of silicone oil includes dimethylsilicone oil, methyl hydrogen silicone oil, methylphenyl silicone oil, amino-modified silicone oil, epoxy-modified silicone oil, carboxy-modified silicone oil, carbinol-modified silicone oil, methacryl-modified silicone oil, mercapto-modified silicone oil, phenol-modified silicone oil, polyether-modified silicone oil, methylstyryl-modified silicone oil, alkyl-modified silicone oil, higher fatty acid ester-modified silicone oil, higher fatty acid amide-modified silicone oil, and fluorine-modified silicone oil. Among these, dimethylsilicone oil, methyl hydrogen silicone oil, and amino-modified silicone oil are preferable.

The siloxane compound may be used alone or in combination of two or more kinds thereof.

Coefficient of Viscosity

The coefficient of viscosity (kinematic viscosity) of the siloxane compound is preferably from 1,000 cSt to 50,000 cSt, more preferably from 2,000 cSt to 30,000 cSt, and still more preferably from 3,000 cSt to 10,000 cSt, from the viewpoint of excellent fluidity, dispersibility, and the handling properties of the silica particle.

The viscosity of the siloxane compound is determined in the following order. Toluene is added to the silica particle, and dispersed for 30 minutes by an ultrasonic wave dispersing machine. After this, supernatant is collected. At this time, a toluene solution of the siloxane compound having a concentration of 1 g/100 ml is prepared. A specific viscosity [$\eta_{sp}$] (25° C.) at this time is determined by the following formula (A).

$$\eta_{sp}=(\eta/\eta_0)-1 \quad \text{Formula (A)}$$

($\eta_0$: viscosity of toluene, $\eta$: viscosity of solution)

Next, an intrinsic viscosity [$\eta$] is determined by substituting the specific coefficient of viscosity [$\eta_{sp}$] to a relational expression of Huggins expressed as the following formula (B).

$$\eta_{sp}=[\eta]+K'[\eta]^2 \quad \text{Formula (B)}$$

(K': constant of Huggins, K'=0.3 ([$\eta$]=when adapting 1 to 3))

Next, a molecular weight M is determined by substituting the intrinsic viscosity [$\eta$] to an A. Kolorlov's equation expressed as the following formula (C).

$$[\eta]=0.215\times 10^{-4}M^{0.65} \quad \text{Formula (C)}$$

Viscosity of siloxane [$\eta$] is determined by substituting the molecular weight M to an equation of A. J. Barry expressed as the following formula (D).

$$\log \eta=1.00+0.0123M^{0.5} \quad \text{Formula (D)}$$

Surface Adhesion Amount

The surface adhesion amount to the surface of the silica particle of the siloxane compound is preferably from 0.01% by weight to 5% by weight, more preferably from 0.05% by weight to 3% by weight, and still more preferably from 0.10% by weight to 2% by weight, with respect to the silica particle, from the viewpoint of excellent fluidity, dispersibility, the handling properties of the silica particle.

The surface adhesion amount is measured by the following method.

100 mg of the silica particles are dispersed in 1 mL of chloroform, 1 μL of DMF is added as internal reference liquid, and then, ultrasonic treatment is performed for 30 minutes by an ultrasonic cleaner, and extraction of the siloxane compound in a chloroform solvent is performed. After this, nucleus spectrum measurement is performed by a JNM-AL400 type nuclear magnetic resonance device (manufactured by Japan Electron Optics Laboratory Co., Ltd.), and the surface adhesion amount of the siloxane compound is obtained from a ratio of a peak area which originates from the siloxane compound with respect to a peak area which originates from DMF.

Here, in the silica particle according to the exemplary embodiment, it is preferable that the surface treatment is performed by the siloxane compound in which a viscosity is from 1,000 cSt to 50,000 cSt, and the surface adhesion amount to the surface of the silica particle of the siloxane compound is from 0.01% by weight to 5% by weight with respect to the silica particle.

By satisfying the above-described requirements, the silica particle which has excellent fluidity and dispersibility and improved handling properties may be obtained.

Method of Preparing Silica Particle

The silica particle according to the exemplary embodiment may be obtained by treating the surface of the silica particle with the siloxane compound having a viscosity of from 1,000 cSt to 50,000 cSt so that the surface adhesion amount is from 0.01% by weight to 5% by weight with respect to the silica particle.

According to the method of preparing a silica particle according to the exemplary embodiment, the silica particle which has excellent fluidity and dispersibility and improved handling properties may be obtained.

Examples of the surface treatment method include a method of treating the surface of the silica particle with the siloxane compound in supercritical carbon dioxide, and a method of treating the surface of the silica particle with the siloxane compound in the air.

Specific examples of the surface treatment method include a method of adhering the siloxane compound to the surface of the silica particle by dissolving the siloxane compound in supercritical carbon dioxide, by using supercritical carbon dioxide; a method of adhering the siloxane compound to the surface of the silica particle by giving (for example, spraying or coating) a solution containing the siloxane compound and a solvent which dissolves the siloxane compound to the surface of the silica particle, in the air; and a method of drying a silica particle dispersion and mixed liquid of the solution after adding and maintaining the solution containing the siloxane compound and the solvent which dissolves the siloxane compound in the silica particle dispersion, in the air.

Among these, as the surface treatment method, the method of adhering the siloxane compound to the surface of the silica particle by using supercritical carbon dioxide is preferable.

When performing the surface treatment in supercritical carbon dioxide, the siloxane compound becomes dissolved in supercritical carbon dioxide. Since supercritical carbon dioxide has a characteristic of low interfacial tension, it may be considered that the siloxane compound in a state of being dissolved in supercritical carbon dioxide is likely to disperse and reach a deep part of a hole portion of the surface of the silica particle together with supercritical carbon dioxide, and the surface treatment is performed with the siloxane compound not only with respect to the surface of the silica particle, but also with respect to the deep part of the hole portion.

For this reason, the silica particle in which the surface treatment is performed with the siloxane compound in supercritical carbon dioxide is considered as a silica particle which is surface-treated to be in a state where the surface is approximately uniform (for example, a state where the surface-treated layer is formed in a shape of a thin film) with the siloxane compound.

In addition, in the method of preparing a silica particle according to the exemplary embodiment, the surface treatment of imparting hydrophobicity to the surface of the silica particle by using the hydrophobic treatment agent together with the siloxane compound in supercritical carbon dioxide may be performed.

In this case, it is considered that both the siloxane compound and the hydrophobic treatment agent are dissolved in supercritical carbon dioxide, the siloxane compound and the hydrophobic treatment agent which are in a dissolved state in supercritical carbon dioxide are likely to disperse and reach the deep part of the hole portion of the surface of the silica particle together with supercritical carbon dioxide, and the surface treatment is performed with the siloxane compound and the hydrophobic treatment agent not only with respect to the surface of the silica particle, but also with respect to the deep part of the hole portion.

As a result, the silica particle which is surface-treated with the siloxane compound and the hydrophobic treatment agent in supercritical carbon dioxide, is treated so that the surface becomes an approximately uniform state by the siloxane compound and the hydrophobic treatment agent, and is likely to be given high hydrophobicity.

In addition, in the method of preparing a silica particle according to the exemplary embodiment, in other preparing steps (for example, a solvent removing step) of the silica particle, supercritical carbon dioxide may be used.

Examples of the method of preparing a silica particle using supercritical carbon dioxide in other preparing steps include a method of preparing a silica particle, including: a step of preparing the silica particle dispersion containing silica particles and a solvent which contains alcohol and water, by the sol-gel method (hereinafter, referred to as a "dispersion preparing step"); a step of removing the solvent from the silica particle dispersion by passing supercritical carbon dioxide (hereinafter, referred to as a "solvent removing step"); and a step of treating the surface of the silica particle after removing the solvent by the siloxane compound, in supercritical carbon dioxide (hereinafter, referred to as a "surface treatment step").

In addition, when removing the solvent from the silica particle dispersion by using supercritical carbon dioxide, formation of coarse powder is likely to be prevented.

The reason thereof is unknown, but the reasons, such as 1) in a case of removing the solvent of the silica particle dispersion, it is possible to remove the solvent without aggregation between the particles by a liquid bridging force when removing the solvent, because of a characteristic of supercritical carbon dioxide that "the interfacial tension does not work", and 2) it is possible to remove the solvent in the silica particle dispersion without generating coarse powder such as secondary aggregates due to condensation of silanol groups, by coming into contact with supercritical carbon dioxide with high efficiency at a relatively low temperature (for example, 250° C. or less), by dissolving the solvent, and by removing supercritical carbon dioxide in which the solvent is dissolved, because of a characteristic of supercritical carbon dioxide that "carbon dioxide is at a temperature and pressure which are equal to or higher than a critical point, and has both diffusibility of gas and solubility of liquid".

Here, the solvent removing step and the surface treatment step may be performed separately, but it is preferable to perform both steps consecutively (that is, each step is performed in a state of being closed to atmospheric pressure). When performing each step consecutively, a chance for the silica particle to adsorb moisture is eliminated after the solvent removing step, and the surface treatment step is performed in a state where adsorption of excessive moisture to the silica particle is prevented. Accordingly, it is not necessary to perform the solvent removing step and the surface treatment step by using a large amount of siloxane compound or at a high temperature which causes excessive heating. As a result, formation of coarse powder is more effectively prevented.

Hereinafter, the method of preparing a silica particle according to the exemplary embodiment will be described in detail for each step.

In addition, the method of preparing a silica particle according to the exemplary embodiment is not limited thereto, and for example, may be 1) an aspect of using supercritical carbon dioxide only in the surface treatment step, and 2) an aspect of performing each step separately.

Hereinafter, each step will be described in detail.

Dispersion Preparing Step

In the dispersion preparing step, for example, silica particle dispersion containing the silica particle and the solvent containing alcohol and water is prepared.

Specifically, in the dispersion preparing step, the silica particle dispersion is prepared by a wet type method (for example, the sol-gel method). In particular, the silica particle dispersion may be prepared by the so-gel method which is the wet type method, specifically, by forming the silica particles by causing the tetraalkoxysilane to react (hydrolysis reaction, condensation reaction) to the solvent containing alcohol and water, in the presence of alkaline catalyst.

In addition, a preferable range of the average equivalent circle diameter of the silica particle, and a preferable range of the average circularity are described above.

In the dispersion preparing step, for example, when the silica particle is obtained by the wet type method, the silica particle is obtained in a state of the dispersion (silica particle dispersion) in which the silica particle is dispersed in the solvent.

Herein, when the process moves on to the solvent removing step, a weight ratio of water to alcohol in the silica particle dispersion prepared is, for example, preferably from 0.05 to 1.0, more preferably from 0.07 to 0.5, and even more preferably from 0.1 to 0.3.

If the weight ratio of water to alcohol in the silica particle dispersion is set within the above range, coarse powder of the silica particles is formed less after the surface treatment, and silica particles that have excellent electrical resistance are easily obtained.

If the weight ratio of water to alcohol is less than 0.05, in the solvent removing step, silanol groups on the surface of the silica particles are condensed less when the solvent is removed. Accordingly, the amount of moisture adsorbed onto the surface of the silica particles having undergone the solvent removal increases, so the electrical resistance of the silica particles having undergone the surface treatment is lowered too much in some cases. Moreover, if the weight ratio of water exceeds 1.0, in the solvent removing step, a large amount of water remains at a point in time when the removal of the solvent in the silica particle dispersion is almost completed. Therefore, the silica particles easily aggregate with each other due to a liquid bridging force and become coarse powder after the surface treatment in some cases.

In addition, when the process moves on to the solvent removing step, a weight ratio of water to the silica particle in the silica particle dispersion prepared is, for example, preferably from 0.02 to 3, more preferably from 0.05 to 1, and even more preferably from 0.1 to 0.5.

If the weight ratio of water to the silica particle in the silica particle dispersion is set within the above range, coarse powder of the silica particles is formed less, and silica particles that have excellent electrical resistance are easily obtained.

If the weight ratio of water to the silica particle is less than 0.02, in the solvent removing step, silanol groups on the surface of the silica particles are condensed extremely less when the solvent is removed. Accordingly, the amount of moisture adsorbed onto the surface of the silica particles having undergone the solvent removal increases, so the electrical resistance of the silica particles is lowered too much in some cases.

Moreover, if the weight ratio of water to the silica particle exceeds 3, in the solvent removing step, a large amount of water remains at a point in time when the removal of the solvent in the silica particle dispersion is almost completed. Therefore, the silica particles easily aggregate with each other due to a liquid bridging force.

In addition, when the process moves on to the solvent removing step, a weight ratio of the silica particle to the silica particle dispersion in the silica particle dispersion prepared is, for example, preferably from 0.05 to 0.7, more preferably from 0.2 to 0.65, and even more preferably from 0.3 to 0.6.

If the weight ratio of the silica particle to the silica particle dispersion is less than 0.05, in the solvent removing step, the amount of supercritical carbon dioxide used increases, and productivity deteriorates.

Moreover, if the weight ratio of the silica particle to the silica particle dispersion exceeds 0.7, a distance between the silica particles in the silica particle dispersion becomes closer, and coarse powder is easily formed due to aggregation or gelling of the silica particles in some cases.

Solvent Removing Step

The solvent removing step is, for example, a step of removing the solvent of the silica particle dispersion by passing supercritical carbon dioxide thereinto.

That is, in the solvent removing step, supercritical carbon dioxide is charged so as to be brought into contact with the silica particle dispersion, whereby the solvent is removed.

Specifically, in the solvent removing step, for example, the silica particle dispersion is put into a closed reaction container. Thereafter, liquefied carbon dioxide is put into the closed reaction container and heated, and the internal pressure of the reaction container is increased using a high-pressure pump to place the carbon dioxide in a supercritical state. Subsequently, the supercritical carbon dioxide is injected into and discharged from the closed reaction container, while being passed into the closed reaction container, that is, the silica particle dispersion.

In this manner, while dissolving the solvent (alcohol and water), the supercritical carbon dioxide is also discharged to the outside the silica particle dispersion (outside the closed reaction container) at the same time together with the solvent entrained, whereby the solvent is removed.

Herein, the supercritical carbon dioxide is carbon dioxide under a temperature and pressure that are equal to or higher than a critical point and has both the diffusibility of gas and the solubility of liquid.

A temperature condition for the solvent removal, that is, the temperature of the supercritical carbon dioxide is, for example, preferably from 31° C. to 350° C., more preferably from 60° C. to 300° C., and even more preferably from 80° C. to 250° C.

If the temperature is lower than the above range, the solvent is not easily dissolved in the supercritical carbon dioxide, and this makes it difficult to remove the solvent. In addition, it is considered that coarse powder may be easily formed due to a liquid bridging force of the solvent or the supercritical carbon dioxide. On the other hand, if the temperature exceeds the above range, it is considered that coarse powder such as secondary aggregates may be easily formed due to the condensation of silanol groups on the surface of the silica particles.

A pressure condition for the solvent removal, that is, the pressure of the supercritical carbon dioxide is, for example, preferably from 7.38 MPa to 40 MPa, more preferably from 10 MPa to 35 MPa, and even more preferably from 15 MPa to 25 MPa.

If the pressure is lower than the above range, the solvent tends not to be easily dissolved in the supercritical carbon dioxide. On the other hand, if the pressure exceeds the above range, the cost of facilities tends to increase.

The amount of the supercritical carbon dioxide injected into and discharged from the closed reaction container is, for example, preferably from 15.4 L/min/m$^3$ to 1540 L/min/m$^3$, and more preferably from 77 L/min/m$^3$ to 770 L/min/m$^3$.

If the injected and discharged amount is less than 15.4 L/min/m$^3$, productivity tends to easily deteriorate since it takes a time for removing the solvent.

On the other hand, if the injected and discharged amount is 1540 L/min/m$^3$ or more, the time during which the supercritical carbon dioxide is in contact with the silica particle dispersion is shortened due to the short passage of the supercritical carbon dioxide. Accordingly, the solvent tends not to be easily removed efficiently.

Surface Treatment Step

The surface treatment step is, for example, a step of treating the surface of the silica particles with a siloxane compound in supercritical carbon dioxide, immediately after the solvent removing step.

That is, in the surface treatment step, for example, while the reaction container is not open to the atmosphere before the process moves on from the solvent removing step, the surface of the silica particles is treated with a siloxane compound in the supercritical carbon dioxide.

Specifically, in the surface treatment step, for example, the supercritical carbon dioxide injected into and discharged from the closed reaction container in the solvent removing step is stopped being injected and discharged, and then the internal temperature and pressure of the closed reaction container are adjusted. In addition, in a state where the supercritical carbon dioxide is present in the closed reaction container, a siloxane compound is put into the container in a certain proportion based on the silica particles. In addition, while this state is being maintained, that is, in the supercritical carbon dioxide, the siloxane compound is reacted, thereby treating the surface of the silica particles.

Herein, in the surface treatment step, notwithstanding that the siloxane compound needs to be reacted in the supercritical carbon dioxide (that is, under the atmosphere of the supercritical carbon dioxide), the surface treatment may be performed while the supercritical carbon dioxide is being passed (that is, while the supercritical carbon dioxide is being injected into and discharged from the closed reaction container), or may be performed without the passing of the supercritical carbon dioxide.

In the surface treatment step, the amount (that is, the charged amount) of the silica particles based on the volume of the reactor is, for example, preferably from 30 g/L to 600 g/L, more preferably from 50 g/L to 500 g/L, and even more preferably from 80 g/L to 400 g/L.

If the amount is smaller than the above range, a density of the siloxane compound based on the supercritical carbon dioxide decreases, and the probability of the contact between the siloxane compound and the surface of silica decreases, which makes it difficult for the reaction to proceed. On the other hand, if the amount is larger than the above range, a density of the siloxane compound based on the supercritical carbon dioxide increases, and the siloxane compound does not fully dissolve in the supercritical carbon dioxide and causes a dispersion defect, whereby coarse aggregates are easily formed.

A density of the supercritical carbon dioxide is, for example, preferably from 0.10 g/ml to 0.80 g/ml, more preferably from 0.10 g/ml to 0.60 g/ml, and even more preferably from 0.2 g/ml to 0.50 g/ml.

If the density is lower than the above range, solubility of the siloxane compound in the supercritical carbon dioxide decreases, whereby aggregates tend to be formed. On the other hand, if the density is higher than the above range, the diffusibility of the supercritical carbon dioxide into the pores of silica deteriorates, such that the surface treatment may be performed insufficiently. Particularly, for sol-gel silica particles containing a large amount of silanol groups, it is desirable to perform the surface treatment within the above density range.

The density of the supercritical carbon dioxide is adjusted by the temperature, pressure, and the like.

Specific examples of the siloxane compound are described above. In addition, a preferable range of a weight average molecular weight of the siloxane compound and a preferable range of the viscosity are also described above.

Among the siloxane compounds, when silicone oil is employed, the silicone oil is likely to adhere to the surface of the silica particle in an approximately uniform state, and fluidity, dispersibility, and the handling properties of the silica particle are likely to be improved.

The amount of use of the siloxane compound with respect to the silica particle, for example, may be from 0.05% by weight to 3% by weight, preferably from 0.1% by weight to 2% by weight, and more preferably from 0.15% by weight to 1.5% by weight, from the viewpoint that the surface adhesion amount with respect to the silica particle is easily controlled to be from 0.01% by weight to 5% by weight.

In addition, the siloxane compound may be used alone, but may be used as liquid mixed with the solvent in which the silica particle is easily dissolved. Examples of the solvent include toluene, methyl ethyl ketone, and methyl isobutyl ketone.

In the surface treatment step, the surface treatment of the silica particle may be performed with a mixture containing a siloxane compound and a hydrophobic treatment agent.

An example of the hydrophobic treatment agent includes a silane hydrophobic treatment agent. An example of the silane hydrophobic treatment agent includes a known silicon compound containing an alkyl group (a methyl group, an ethyl group, a propyl group, and a butyl group), specifically includes a silazane compound (a silane compound, such as methyltrimethoxysilane, dimethyldimethoxysilane, trimethylchlorosilane, and trimethylmethoxysilane; hexamethyldisilazane; and tetramethyldisilazane). The hydrophobic treatment agent may be used alone or in combination of plural kinds thereof.

Among the silane hydrophobic treatment agents, the silicon compound containing a trimethyl group, such as trimethylmethoxysilane and hexamethyldisilazane (HMDS), particularly hexamethyldisilazane (HMDS), is preferable.

The amount of use of the silane hydrophobic treatment agent is not particularly limited, but, for example, with respect to the silica particle, may be from 1% by weight to 100% by weight, preferably from 3% by weight to 80% by weight, and more preferably from 5% by weight to 50% by weight.

In addition, the silane hydrophobic treatment agent may be used alone, but may be used as liquid mixed with the solvent in which the silane hydrophobic treatment agent is easily dissolved. Examples of the solvent include toluene, methyl ethyl ketone, and methyl isobutyl ketone.

The temperature condition of the surface treatment, that is, the temperature of supercritical carbon dioxide is, for example, from 80° C. to 300° C., preferably from 100° C. to 250° C., and more preferably from 120° C. to 200° C.

When the temperature is less than above range, there may be a case where performance of the surface treatment with the siloxane compound deteriorates. On the other hand, when the temperature exceeds the above range, there is a case where condensation reaction proceeds due to silanol groups of the silica particle, and particle aggregates are formed. In particular, the surface treatment within the above temperature range may be performed with respect to the sol-gel silica particle containing a large amount of silanol groups.

Meanwhile, a pressure condition of the surface treatment, that is, pressure of supercritical carbon dioxide may be a condition which satisfies the above-described density, but, for example, may be from 8 MPa to 30 MPa, preferably from 10 MPa to 25 MPa, and more preferably from 15 Mpa to 20 MPa.

The silica particle is obtained through each step described above.

EXAMPLE

Hereinafter, the exemplary embodiment will be described in more detail by using examples and comparative examples, but the exemplary embodiment is not limited to the examples. In addition, "parts" indicates "parts by weight" when it is not particularly limited.

Preparing Silica Particle Dispersion (1)

300 parts of methanol and 70 parts of 10% of ammonia water are added and mixed in a glass reaction container which has a volume of 1.5 L and is equipped with an agitator, a dripping nozzle, and a thermometer, and an alkali catalyst solution is obtained.

After adjusting the alkali catalyst solution to have 30° C., while stirring, 185 parts of tetramethoxysilane and 50 parts of 8.0% of ammonia water are dripped at the same time, and hydrophilic silica particle dispersion (having a solid component concentration of 12.0% by weight) is obtained. Here, the dripping time is 30 minutes.

After this, the obtained silica particle dispersion is concentrated to 40% by weight of solid component concentration by a rotary filter R-Fine (manufactured by Kotobuki Industries Co., Ltd.). The concentrated dispersion is a silica particle dispersion (1).

Preparing Silica Particle Dispersions (2) to (4)

Silica particle dispersions (2) to (4) are prepared similar to the silica particle dispersion (1), except that the alkali catalyst solution (an amount of methanol, and an amount of 10% of ammonia water), and a formation condition of the silica particle (a total dripping amount of tetramethoxysilane (described as TMOS) and 8% of ammonia water to the alkali catalyst solution, and dripping time) change in preparing the silica particle dispersion (1), as indicated in Table 1.

The silica particle dispersions (1) to (4) are collectively shown in Table 1.

TABLE 1

| Silica particle dispersion | Alkali catalyst solution | | Formation condition of silica particle | | |
|---|---|---|---|---|---|
| | Methanol (parts) | 10% of ammonia water (parts) | Total dripping amount of TMOS (parts) | Total dripping amount of 8% of ammonia water (parts) | Dripping time |
| (1) | 300 | 70 | 185 | 50 | 30 min |
| (2) | 300 | 70 | 340 | 92 | 55 min |
| (3) | 300 | 46 | 40 | 25 | 30 min |
| (4) | 300 | 70 | 62 | 17 | 10 min |

Example 1

Preparation Surface-treated Silica Particle (S1)

By using the silica particle dispersion (1), as described below, the surface treatment is performed with the siloxane compound under an atmosphere of supercritical carbon dioxide with respect to the silica particle. In addition, in the surface treatment, a device which is equipped with a carbon dioxide cylinder, a carbon dioxide pump, an entrainer pump, an autoclave with an agitator (having a volume of 500 ml), and a pressure value, is used.

First, 300 parts of the silica particle dispersion (1) is put into the autoclave with an agitator (having a volume of 500 ml), and the agitator is rotated at 100 rpm. After this, liquefied carbon dioxide is injected into the autoclave, the pressure is increased by the carbon dioxide pump while increasing the temperature by a heater, and the inside of the autoclave is placed in a supercritical state of 150° C. and 15 MPa. The supercritical carbon dioxide is passed by the carbon dioxide pump while maintaining the pressure inside the autoclave to be 15 MPa by the pressure value, methanol and water are removed from the silica particle dispersion (1) (solvent removing step), and the silica particle (untreated silica particle) is obtained.

Next, at a point when a passage amount of the supercritical carbon dioxide passed (integration amount: measured as a passage amount of carbon dioxide in a reference state) becomes 900 parts, the supercritical carbon dioxide is stopped to pass.

After this, in a state where 150° C. of temperature is maintained by the heater and 15 MPa of pressure is maintained by the carbon dioxide pump, and the supercritical state of carbon dioxide is maintained inside the autoclave, a treating agent solution in which 0.3 parts of dimethylsilicone oil (DSO: product name "KF-96 (manufactured by Shin-Etsu Chemical Co, Ltd.)") in which the viscosity is 10,000 cSt is dissolved, is injected into the autoclave by the entrainer pump, as the siloxane compound, to 20 parts of hexamethyldisilazane (HMDS: manufactured by Yuki Gosei Kogyo Co., Ltd.) as a hydrophobic treatment agent in advance, with respect to 100 parts of the above-described silica particles (untreated silica particles). Then, while stirring, the solution is reacted for 20 minutes at 180° C. After this, the supercritical carbon dioxide passes again, and excessive treating agent solution is removed. After this, the stirring is stopped, the pressure inside the autoclave is released to the atmospheric pressure by opening the pressure valve, and the temperature is lowered to a room temperature (25° C.)

In this manner, by consecutively performing the solvent removing step and the surface treatment with the siloxane compound, a surface-treated silica particle (S1) is obtained.

Examples 2 to 5, and 7 to 9

Preparation Surface-treated Silica Particles (S2) to (S5), and (S7) to (S9)

Surface-treated silica particles (S2) to (S5), and (S7) to (S9) are prepared similar to the surface-treated silica particle (S1), except that the silica particle dispersion and the condition of the surface treatment (atmosphere of treatment, siloxane compound (a type, a viscosity, and an amount added), the hydrophobic treatment agent, and the amount added of the hydrophobic treatment agent) change in preparing the surface-treated silica particle (S1) of Example 1, as indicated in Table 2.

Example 6

Preparation Surface-treated Silica Particle (S6)

As described below, the surface treatment with the siloxane compound is subjected to the silica particle under the atmosphere pressure by using the dispersion similar to the silica particle dispersion (1) which is used in preparing the surface-treated silica particle (S1) of Example 1.

An ester adapter and a cooling tube are attached to the reaction container which is used in preparing the silica particle dispersion (1), water is added when the silica particle dispersion (1) is heated to 60° C. to 70° C. and methanol is removed, and further, the temperature is heated to 70° C. to 90° C. and the methanol is removed, and an aqueous dispersion of the silica particle is obtained. 3 parts of methyltrimethoxysilane (MTMS: manufactured by Shin-Etsu Chemical Co, Ltd.) is added to 100 parts of silica solid contents in the aqueous dispersion at a room temperature, and reacted for two hours, and the surface treatment of the silica particle is performed. After adding methyl isobutyl ketone to the surface treatment dispersion, the temperature is heated to 80° C. to 110° C., methanol water is removed, 80 parts of hexamethyldisilazane (HMDS: manufactured by Yuki Gosei Kogyo Co., Ltd.) and 0.3 parts of dimethylsilicone oil (DSO: product name "KF-96 (manufactured by Shin-Etsu Chemical Co, Ltd.)") in which a viscosity is 10,000 cSt as the siloxane compound are added to 100 parts of the silica solid contents in the obtained dispersion at a room temperature, the dispersion is reacted for 3 hours at 120° C. and is cooled. After this, the dispersion is dried by spraying and drying, and a surface-treated silica particle (S6) is obtained.

Example 10

Preparation Surface-treated Silica Particle (S10)

A surface-treated silica particle (S10) is prepared according to a method similar to Example 1 except that fumed silica OX50 (manufactured by Nippon Aerosil Co., Ltd.) is used instead of the surface-treated silica particle (S1) of Example 1. In other words, 100 parts of the fumed silica OX50 is put into the autoclave with the agitator which is the same as that in Example 1, and the agitator is rotated at 100 rpm. After this, the liquefied carbon dioxide is injected into the autoclave, the pressure is increased by the carbon dioxide pump while increasing the temperature by the heater, and the inside of the autoclave is placed in a supercritical state of 180° C. and 15 MPa. While maintaining the inside of the autoclave to be 15 MPa by the pressure valve, a treating agent solution in which 0.3 parts of dimethylsilicone oil (DSO: product name "KF-96 (manufactured by Shin-Etsu Chemical Co, Ltd.)") in which a viscosity is 10,000 cSt as the siloxane compound is dissolved in 20 parts of hexamethyldisilazane (HMDS: manufactured by Yuki Gosei Kogyo Co., Ltd.) as the hydrophobic treatment agent in advance, is injected into the autoclave by the entrainer pump. Then, while stirring, the dispersion is reacted for 20 minutes at 180° C. After this, supercritical carbon dioxide is passed, excessive treating agent solution is removed, and the surface-treated silica particle (S10) is obtained.

Comparative Example 1

Preparation Surface-treated Silica Particle (SC1)

A surface-treated silica particle (SC1) is prepared similar to the surface-treated silica particle (S1) except that the siloxane compound is not added in preparing the surface-treated silica particle (S1) of Example 1.

Comparative Examples 2 to 4

Preparation Surface-treated Silica Particles (SC2) to (SC4)

Surface-treated silica particles (SC2) to (SC4) are prepared similar to the surface-treated silica particle (S1) except that the silica particle dispersion and the condition of the surface treatment (atmosphere of treatment, siloxane compound (a type, a viscosity, and an amount added), the hydrophobic treatment agent, and the amount added of the hydrophobic treatment agent) change in preparing the surface-treated silica particle (S1) of Example 1, as indicated in Table 3.

Comparative Example 5

Preparation Surface-treated Silica Particle (SC5)

A surface-treated silica particle (SC5) is prepared similar to the surface-treated silica particle (S6) except that the siloxane compound is not added in preparing the surface-treated silica particle (S6) of Example 6.

Evaluation

With respect to the surface-treated silica particles obtained in each example, an average equivalent circle diameter, average circularity, an adhesion amount of the siloxane compound with respect to the untreated silica particle, a compression and aggregation degree, a particle compression ratio, and a particle dispersion degree, are measured by the above-described method.

Characteristics (handling properties, fluidity, and dispersibility) of the surface-treated silica particle are comprehensively evaluated by the following three grades. G1 means that the characteristics of the surface-treated silica particles are the most excellent. Hereinafter, the compression and aggregation degree and the particle compression ratio which are divided in each grade will be shown. In addition, the results are shown in Tables 2 and 3.

Evaluation Reference

G1: 70%≤compression and aggregation degree≤95%, and 0.28≤particle compression ratio≤0.36

G2: 60%≤compression and aggregation degree<70%, and 0.20≤particle compression ratio<0.28 or 0.36<particle compression ratio≤0.40

G3: at least one of the requirements for the range of the compression and aggregation degree and the particle compression ratio described in G2 is not satisfied.

In addition, the particle dispersion degree is preferably 90% or greater, and more preferably 95% or greater.

TABLE 2

| | Surface-treated silica particle | Silica particle dispersion | Siloxane compound Type | Coefficient of viscosity (cSt) | Amount added (parts) | Treatment atmosphere | Hydrophobic treatment agent/ number of parts | Average equivalent circle diameter (nm) | Average circularity | Surface adhesion amount (% by weight) | Compression and aggregation degree (%) | Particle compression ratio | Particle dispersion degree (%) | Total evaluation |
|---|---|---|---|---|---|---|---|---|---|---|---|---|---|---|
| Example 1 | (S1) | (1) | DSO | 10000 | 0.3 parts | supercritical $CO_2$ | HMDS/20 parts | 120 | 0.958 | 0.28 | 85 | 0.310 | 98 | G1 |
| Example 2 | (S2) | (1) | DSO | 10000 | 1.0 parts | supercritical $CO_2$ | HMDS/20 parts | 120 | 0.958 | 0.98 | 92 | 0.280 | 97 | G1 |
| Example 3 | (S3) | (1) | DSO | 5000 | 0.15 parts | supercritical $CO_2$ | HMDS/20 parts | 120 | 0.958 | 0.12 | 80 | 0.320 | 99 | G1 |
| Example 4 | (S4) | (1) | DSO | 5000 | 0.5 parts | supercritical $CO_2$ | HMDS/20 parts | 120 | 0.958 | 0.47 | 88 | 0.295 | 98 | G1 |
| Example 5 | (S5) | (2) | DSO | 10000 | 0.2 parts | supercritical $CO_2$ | HMDS/20 parts | 140 | 0.962 | 0.19 | 81 | 0.360 | 99 | G1 |
| Example 6 | (S6) | (1) | DSO | 10000 | 1.0 parts | Atmosphere | HMDS/80 parts | 120 | 0.958 | 0.50 | 83 | 0.380 | 93 | G2 |
| Example 7 | (S7) | (3) | DSO | 10000 | 0.3 parts | supercritical $CO_2$ | HMDS/20 parts | 130 | 0.850 | 0.29 | 68 | 0.350 | 92 | G2 |
| Example 8 | (S8) | (4) | DSO | 10000 | 0.3 parts | supercritical $CO_2$ | HMDS/20 parts | 90 | 0.935 | 0.29 | 94 | 0.390 | 95 | G2 |
| Example 9 | (S9) | (1) | DSO | 50000 | 1.5 parts | supercritical $CO_2$ | HMDS/20 parts | 120 | 0.958 | 1.25 | 95 | 0.240 | 91 | G2 |
| Example 10 | (S10) | Fumed silica OX50 | DSO | 10000 | 0.3 parts | supercritical $CO_2$ | HMDS/20 parts | 80 | 0.680 | 0.26 | 84 | 0.395 | 92 | G2 |

TABLE 3

| | Surface-treated silica particle | Silica particle dispersion | Siloxane compound Type | Coefficient of viscosity (cSt) | Amount added (parts) | Treatment atmosphere | Hydrophobic treatment agent/ number of parts | Average equivalent circle diameter (nm) | Average circularity | Surface adhesion amount (% by weight) | Compression and aggregation degree (%) | Particle compression ratio | Particle dispersion degree (%) | Total evaluation |
|---|---|---|---|---|---|---|---|---|---|---|---|---|---|---|
| Comparative Example 1 | (SC1) | (1) | — | — | — | supercritical $CO_2$ | HMDS/20 parts | 120 | 0.958 | — | 55 | 0.415 | 99 | G3 |
| Comparative Example 2 | (SC2) | (1) | DSO | 100 | 3.0 parts | supercritical $CO_2$ | HMDS/20 parts | 120 | 0.958 | 2.5 | 98 | 0.450 | 75 | G3 |
| Comparative Example 3 | (SC3) | (1) | DSO | 1000 | 8.0 parts | supercritical $CO_2$ | HMDS/20 parts | 120 | 0.958 | 7.0 | 99 | 0.360 | 83 | G3 |
| Comparative Example 4 | (SC4) | (3) | DSO | 3000 | 10.0 parts | supercritical $CO_2$ | HMDS/20 parts | 120 | 0.850 | 8.5 | 99 | 0.380 | 85 | G3 |
| Comparative Example 5 | (SC5) | (1) | — | — | — | Atmosphere | HMDS/20 parts | 120 | 0.958 | — | 62 | 0.425 | 98 | G3 |

From the above-described results, it may be known that a silica particle in which the compression and aggregation degree is from 60% to 95% and the particle compression ratio is from 0.20 to 0.40 may be obtained. As a result, it may be known that the silica particle of the Example is a silica particle which has excellent fluidity and dispersibility and improved handling properties.

It may be known that the compression and aggregation degree and the particle dispersion degree in Example 2 in which surface treatment is performed with the siloxane compound in supercritical carbon dioxide is higher than those in Example 6 in which surface treatment is performed with the siloxane compound in the air.

Hereinafter, abbreviations in Tables 2 and 3 will be described.

DSO: dimethylsilicone oil
HMDS: hexamethyldisilazane

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A silica particle, which has a compression and aggregation degree of from 60% to 95% and a particle compression ratio of from 0.20 to 0.40, wherein:
    the silica particle is a sol-gel silica and is subjected to a surface treatment with a siloxane compound having a viscosity of from 1,000 cSt to 50,000 cSt, whereby the siloxane compound is present inside holes on the surface of the silica particle, and
    a surface adhesion amount of the siloxane compound is from 0.01% by weight to 5% by weight with respect to the silica particle.

2. The silica particle according to claim 1, which has an average equivalent circle diameter of from 40 nm to 200 nm.

3. The silica particle according to claim 1, which has a particle dispersion degree of from 90% to 100%.

4. The silica particle according to claim 1, wherein the silica particle is hydrophobic.

5. The silica particle according to claim 1, wherein the siloxane compound is silicone oil.

6. The silica particle according to claim 5, wherein the silicone oil is dimethylsilicone oil.

7. A method of preparing a silica particle, comprising:
    treating a surface of a silica particle with a siloxane compound having a viscosity of from 1,000 cSt to 50,000 cSt so that the siloxane compound is present inside holes on the surface of the silica particle and a surface adhesion amount of the siloxane compound is from 0.01% by weight to 5% by weight with respect to the silica particle, thereby preparing a silica particle having a compression and aggregation degree of from 60% to 95% and a particle compression ratio of from 0.20 to 0.40,
    wherein the silica particle is a sol-gel silica.

8. The method of preparing a silica particle according to claim 7,
    wherein the silica particle has an average equivalent circle diameter of from 40 nm to 200 nm.

9. The method of preparing a silica particle according to claim 7,
    wherein the silica particle has a particle dispersion degree of from 90% to 100%.

10. The method of preparing a silica particle according to claim 7,
    wherein the treating is performed in supercritical carbon dioxide.

11. The method of preparing a silica particle according to claim 7,
    wherein the siloxane compound is silicone oil.

* * * * *